(12) United States Patent
Lee et al.

(10) Patent No.: US 10,933,712 B2
(45) Date of Patent: Mar. 2, 2021

(54) COOLING AND HEATING SYSTEM FOR HIGH-VOLTAGE BATTERY OF VEHICLE

(71) Applicants: Hyundai Motor Company, Seoul (KR); Kia Motors Corporation, Seoul (KR)

(72) Inventors: Sang Shin Lee, Gyeonggi-Do (KR); Man Ju Oh, Gyeonggi-do (KR); So Yoon Park, Gyeonggi-do (KR); Jae Woong Kim, Gyeonggi-do (KR); So La Chung, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 257 days.

(21) Appl. No.: 15/899,806

(22) Filed: Feb. 20, 2018

(65) Prior Publication Data

US 2019/0152286 A1    May 23, 2019

(30) Foreign Application Priority Data

Nov. 21, 2017   (KR) ........................ 10-2017-0155526

(51) Int. Cl.
*B60H 1/00* (2006.01)
*B60H 1/32* (2006.01)
(Continued)

(52) U.S. Cl.
CPC ..... *B60H 1/00278* (2013.01); *B60H 1/00328* (2013.01); *B60H 1/00342* (2013.01);
(Continued)

(58) Field of Classification Search
CPC ..... B60L 58/24; B60L 58/26; B60H 1/00278; B60H 2001/00307; B60H 1/00328;
(Continued)

(56) References Cited

U.S. PATENT DOCUMENTS

| 4,007,315 A | * | 2/1977 | Brinkmann | ......... | H01M 10/625 |
| | | | | | 429/62 |
| 5,490,572 A | * | 2/1996 | Tajiri | ................. | B60H 1/00392 |
| | | | | | 180/65.1 |

(Continued)

FOREIGN PATENT DOCUMENTS

| JP | 5533640 B2 | 6/2014 |
| JP | 2016119216 A | 6/2016 |

(Continued)

OTHER PUBLICATIONS

Machine Translation KR 20090055055A (Year: 2009).*

*Primary Examiner* — Len Tran
*Assistant Examiner* — Gustavo A Hincapie Serna
(74) *Attorney, Agent, or Firm* — Mintz Levin Cohn Ferris Glovsky and Popeo, P.C.; Peter F. Corless (57) ABSTRACT

Disclosed is a cooling and heating system for a high-voltage battery of a vehicle, which includes: a radiator provided adjacent to a lower portion of a high-voltage battery module to radiate heat to outside air; an outside air cooling line configured such that cooling water circulates between the radiator and the high-voltage battery module, with a main valve being provided on the outside air cooling line; a bypass line configured such that a first end thereof branches from the main valve and a second end thereof is connected to the outside air cooling line to bypass the radiator, with a heat exchanger being provided on the bypass line; and a controller configured to control the high-voltage battery module to radiate heat through the radiator or to exchange heat with the heat exchanger by controlling the main valve when heat exchange of the high-voltage battery module is required.

17 Claims, 7 Drawing Sheets

(51) Int. Cl.
*H01M 10/625* (2014.01)
*H01M 10/6568* (2014.01)
*H01M 10/6561* (2014.01)
*B60H 1/22* (2006.01)
*H01M 10/63* (2014.01)

(52) U.S. Cl.
CPC ..... *B60H 1/00392* (2013.01); *B60H 1/00485* (2013.01); *B60H 1/00885* (2013.01); *B60H 1/2221* (2013.01); *B60H 1/3227* (2013.01); *B60H 1/32281* (2019.05); *H01M 10/625* (2015.04); *H01M 10/63* (2015.04); *H01M 10/6561* (2015.04); *H01M 10/6568* (2015.04); *B60H 2001/00307* (2013.01); *H01M 2220/20* (2013.01)

(58) Field of Classification Search
CPC ........... B60H 1/00342; B60H 1/00392; B60H 1/00485; B60H 1/00885; B60H 1/2221; B60H 1/3227; B60H 1/32281; H01M 10/613; H01M 10/615; H01M 10/625; H01M 10/6561; H01M 10/6563; H01M 10/6568; H01M 10/663; H01M 2220/20
USPC ............ 165/202, 280, 283, 41; 236/34, 34.5
See application file for complete search history.

(56) References Cited

U.S. PATENT DOCUMENTS

| | | | | |
|---|---|---|---|---|
| 6,357,541 | B1 * | 3/2002 | Matsuda | B60K 6/22 180/68.2 |
| 7,975,757 | B2 * | 7/2011 | Nemesh | B60H 1/00278 165/42 |
| 8,448,460 | B2 * | 5/2013 | Dogariu | B60H 1/00278 62/179 |
| 8,846,226 | B2 * | 9/2014 | Tasai | H01M 10/643 429/72 |
| 8,997,503 | B2 * | 4/2015 | Morisita | B60H 1/00921 62/79 |
| 9,533,545 | B2 * | 1/2017 | Chang | B60H 1/08 |
| 9,649,909 | B2 * | 5/2017 | Enomoto | B60K 6/22 |
| 9,923,214 | B2 * | 3/2018 | Kawakami | H01M 10/613 |
| 9,937,818 | B2 * | 4/2018 | Newman | H01M 2/1083 |
| 10,118,458 | B2 * | 11/2018 | Kim | B60H 1/00921 |
| 10,263,301 | B2 * | 4/2019 | Kenney | H01M 10/6556 |
| 10,406,886 | B2 * | 9/2019 | Kim | H01M 10/663 |
| 10,457,156 | B2 * | 10/2019 | Takizawa | B60K 1/04 |
| 2013/0224574 | A1 * | 8/2013 | Favaretto | B60K 1/04 429/186 |
| 2014/0023906 | A1 * | 1/2014 | Hashimoto | H01M 2/1094 429/120 |
| 2014/0193683 | A1 * | 7/2014 | Mardall | H01M 10/6562 429/99 |
| 2015/0191101 | A1 * | 7/2015 | Rawlinson | B60L 11/1874 429/62 |
| 2018/0015839 | A1 * | 1/2018 | Ito | B60K 11/04 |
| 2018/0017986 | A1 * | 1/2018 | Lahiri | G05F 3/30 |
| 2018/0086224 | A1 * | 3/2018 | King | B60L 58/26 |
| 2018/0118011 | A1 * | 5/2018 | Grace | B60L 58/22 |
| 2019/0047365 | A1 * | 2/2019 | Sonnekalb | B60L 3/0053 |
| 2019/0061543 | A1 * | 2/2019 | Jovet | B60L 53/30 |
| 2019/0118610 | A1 * | 4/2019 | Johnston | B60H 1/00899 |

FOREIGN PATENT DOCUMENTS

| | | | |
|---|---|---|---|
| KR | 20090055055 A | * | 6/2009 |
| KR | 100941215 B1 | | 2/2010 |
| KR | 20120066340 A | | 6/2012 |

* cited by examiner

FIG. 8

COOLING AND HEATING SYSTEM FOR HIGH-VOLTAGE BATTERY OF VEHICLE

CROSS REFERENCE TO RELATED APPLICATION

The present application claims priority to Korean Patent Application No. 10-2017-0155526, filed Nov. 21, 2017, the entire contents of which is incorporated herein for all purposes by this reference.

BACKGROUND OF THE INVENTION

Field of the Invention

The present invention relates generally to a cooling and heating system for a high-voltage battery provided with a high-voltage battery module supplying drive energy to a vehicle. More particularly, the present invention relates to a cooling and heating system for a high-voltage battery of a vehicle, in which a radiator is disposed adjacent to the high-voltage battery, whereby it is possible to efficiently perform cooling and heating of the high-voltage battery module.

Description of the Related Art

An electric vehicle equipped with a high-voltage battery module that provides drive energy to the vehicle is an automobile that derives its drive energy from electric energy rather than from fossil fuel combustion. Although electric vehicles generate no exhaust gas and very little noise, they have not been put to practical use due to problems such as heavy weight of a high-voltage battery and time taken to charge the battery. However, recently, the development of electric vehicles is being accelerated again due to serious problems of pollution and depletion of fossil fuels. Particularly, in order for the electric vehicle to be put to practical use, the high-voltage battery module, which is the fuel supply source of the electric vehicle, must be made lighter and smaller, and at the same time, the charging time must be shortened, so research related thereto is underway.

The high-voltage battery module includes a plurality of battery cells connected in series, and in order to effectively charging and discharging the high-voltage battery module, the high-voltage battery module must maintain a proper temperature. Accordingly, a cooling and heating system for a high-voltage battery is provided such that the high-voltage battery module is checked in real time according to the environment, such as the outdoor environment or vehicle driving, whereby cooling or heating of the high-voltage battery module is performed.

However, the conventional cooling and heating system for a high-voltage battery of a vehicle is problematic in that a radiator for cooling the high-voltage battery module is disposed at the front of the vehicle, and the high-voltage battery module is disposed at a floor panel at the back of the vehicle, whereby heat loss occurs while the heat-exchanged cooling water through the radiator moves to the high-voltage battery module. It is further problematic in that since a heat pick-up phenomenon occurs due to the temperature outside the vehicle occurring during vehicle travel, heat may be absorbed in the high-voltage battery module.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to propose a cooling and heating system for a high-voltage battery of a vehicle, in which heat-exchanged cooling water through a radiator prevents heat loss and prevents the high-voltage battery from being heated due to the temperature outside the vehicle.

In order to achieve the above object, according to one aspect of the present invention, there is provided a cooling and heating system for a high-voltage battery of a vehicle, the cooling and heating system including: a radiator provided adjacent to a lower portion of a high-voltage battery module to radiate heat to outside air of a lower portion of the vehicle; an outside air cooling line configured such that cooling water circulates between the radiator and the high-voltage battery module, with a main valve being provided on the outside air cooling line through which the cooling water circulates; a bypass line configured such that a first end thereof branches from the main valve and a second end thereof is connected to the outside air cooling line to bypass the radiator, with a heat exchanger being provided on the bypass line, whereby the cooling water exchanges heat with an external cooling medium at the heat exchanger; and a controller configured to control the high-voltage battery module to radiate heat through the radiator or to exchange heat with the heat exchanger by controlling the main valve when heat exchange of the high-voltage battery module is required.

The outside air cooling line and the bypass line may form flow paths independent from each other, wherein the bypass line shares a part of a line including the high-voltage battery module of the outside air cooling line to form a closed loop.

The main valve may be a multiway valve constituted by a first port at a side of the radiator, a second port at a side of the bypass line, and a third port at a side of the high-voltage battery module; and the controller may close the second port of the main valve when cooling of the high-voltage battery module is required such that the cooling water circulates through the outside air cooling line to exchange heat with the radiator, thereby performing cooling of the high-voltage battery module.

The main valve may be a multiway valve constituted by a first port at a side of the radiator, a second port at a side of the bypass line, and a third port at a side of the high-voltage battery module; and the controller may close the first port of the main valve when cooling of the high-voltage battery module is required such that the cooling water circulates while sharing a part of a line including the high-voltage battery module of the outside air cooling line with the bypass line, whereby the cooling water exchanges heat with the heat exchanger to perform cooling of the high-voltage battery module.

The main valve may be a multiway valve constituted by a first port at a side of the radiator, a second port at a side of the bypass line, and a third port at a side of the high-voltage battery module; and the controller may close the first port of the main valve when heating of the high-voltage battery module is required such that the cooling water circulates while sharing a part of a line including the high-voltage battery module of the outside air cooling line with the bypass line, whereby the cooling water exchanges heat with the heat exchanger to perform heating of the high-voltage battery module.

The outside air cooling line may be provided with a circulating pump, and the controller may drive or stop the circulating pump.

The circulating pump may be disposed between the bypass line and the high-voltage battery module, at a side of a line including the high-voltage battery module of the outside air cooling line.

The bypass line may be heat exchangeable with an indoor air conditioning-refrigerant line through the heat exchanger, so as to exchange heat with the refrigerant line when cooling the high-voltage battery module, whereby the cooled cooling water cools the high-voltage battery module.

The refrigerant line may be provided with a connecting valve configured to supply or block a refrigerant such that the refrigerant of the refrigerant line exchanges heat with the cooling water of the bypass line in the heat exchanger.

The heat exchanger may be a chiller configured to cool the cooling water by exchanging heat with the refrigerant of the indoor air conditioning-refrigerant line.

The heat exchanger is a heater configured to heat the cooling water by exchanging heat with the refrigerant of the indoor air conditioning-refrigerant line.

The heat exchanger may be an electric heater controlled by the controller.

The heat exchanger may include a heat exchanger for cooling and a heat exchanger for heating, wherein one heat exchanger is disposed on the bypass line, and the other heat exchanger is connected in parallel between the bypass line and the outside air cooling line including the high-voltage battery module to constitute a branch line, wherein the branch line is provided with an auxiliary valve configured to connect the branch line and the outside air cooling line together or disconnect the same from each other.

The radiator may have a size corresponding to an area of the high-voltage battery module or larger than the area.

An insulation part defining a predetermined space may be provided between the high-voltage battery module and the radiator.

The high-voltage battery module may include a cooling water channel disposed at a lower portion of the high-voltage battery, and the cooling water circulates through the cooling water channel, whereby the high-voltage battery is cooled or heated.

The radiator may be disposed at a lower portion of the cooling water channel, and an insulation part may be disposed between the cooling water channel and radiator.

The radiator may be provided with a heat sink fin protruding in a direction opposite to the high-voltage battery module.

A casing may be provided outside the high-voltage battery module and the radiator to surround the high-voltage battery module and the radiator, and the heat sink fin may be exposed outside the casing by penetrating through the casing.

The heat sink fin may be formed to be long in forward and backward directions of the vehicle such that the heat sink fin is cooled by running wind during vehicle travel.

In a cooling mode, the controller may control the main valve such that the cooling water circulates through the outside air cooling line, and control the cooling water cooled by exchanging heat through the radiator to cool the high-voltage battery module.

In a cooling mode, the controller may control the main valve such that the bypass line and a part of a line including the high-voltage battery module of the outside air cooling line form a closed loop to allow the cooling water to circulate therethrough, and control the cooling water cooled by exchanging heat through the heat exchanger to cool the high-voltage battery module.

In a heating mode, the controller may control the main valve such that the bypass line and a part of a line including the high-voltage battery module of the outside air cooling line form a closed loop to allow the cooling water to circulate therethrough, and control the cooling water heated by exchanging heat through the heat exchanger to heat the high-voltage battery module.

According to the cooling and heating system for a high-voltage battery of a vehicle of the present invention configured as described above, since the cooling water channel, the insulation part, and the radiator are disposed under the high-voltage battery module, it is possible to selectively control the heat transfer according to the ambient temperature, thereby solving the problem of the heat pick-up phenomenon of a vehicle provided with a conventional high-voltage battery module. Further, by applying the radiator of the high-voltage battery module separated from a conventional cooling module, it is possible to prevent heat loss and improve heat exchange performance, and by minimizing piping to achieve a compact layout, it is possible to reduce weight and save cost.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinbelow, a cooling and heating system for a high-voltage battery of a vehicle according to an exemplary embodiment of the present invention will be described in detail with reference to the accompanying drawings.

Figure 1:
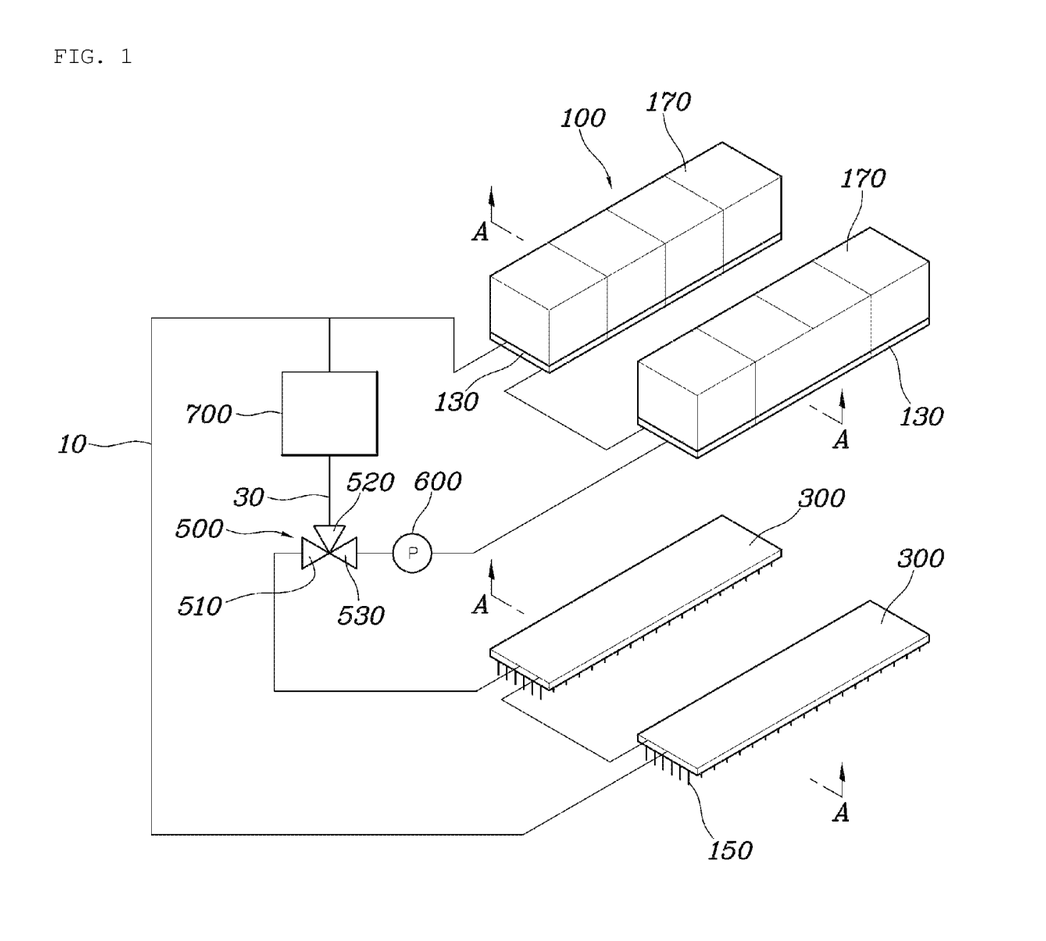
FIG. 1 is a view schematically showing a cooling and heating system for a high-voltage battery of a vehicle according to an embodiment of the present invention.
Figure 2:
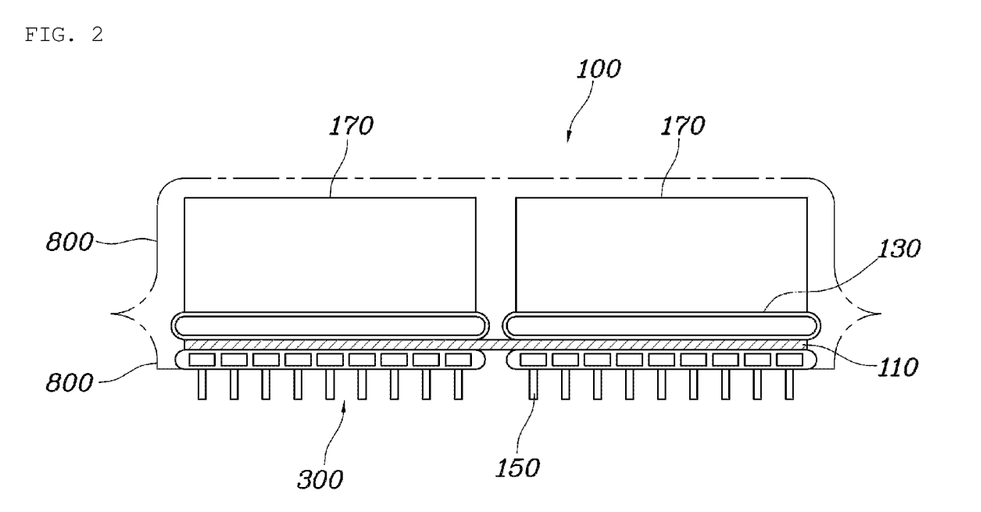
FIG. 2 is a sectional view taken along line A-A of FIG. 1.
Figure 3:
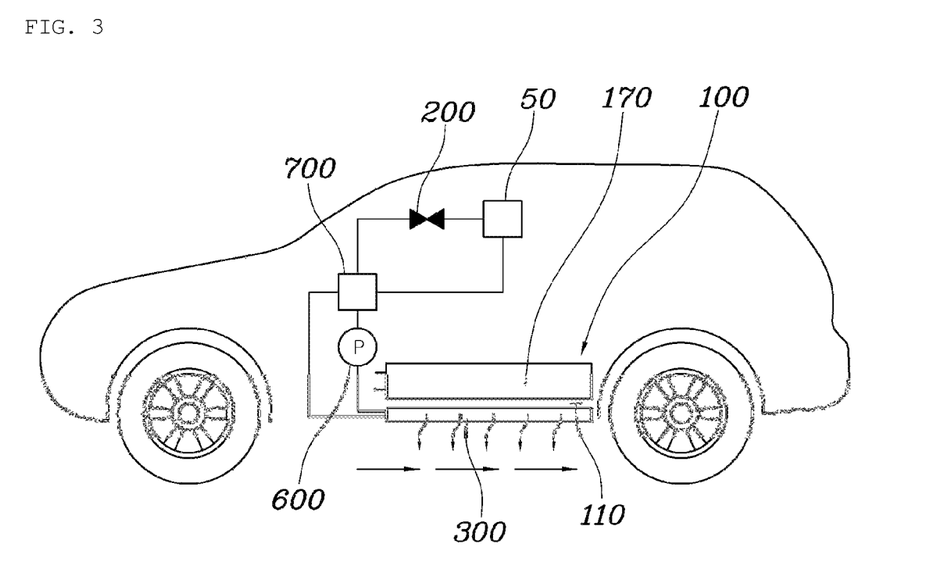
FIG. 3 is a view showing a vehicle with the cooling and heating system of FIG. 1 mounted thereto.
Figure 4:
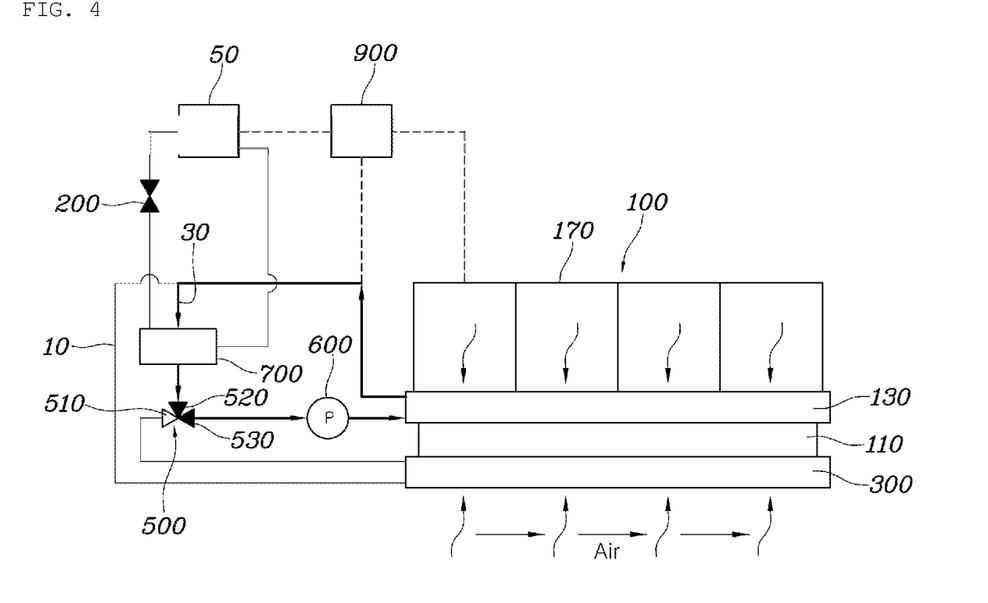
FIG. 4 is a view showing a case of a cooling mode using a heat exchanger.
Figure 5:
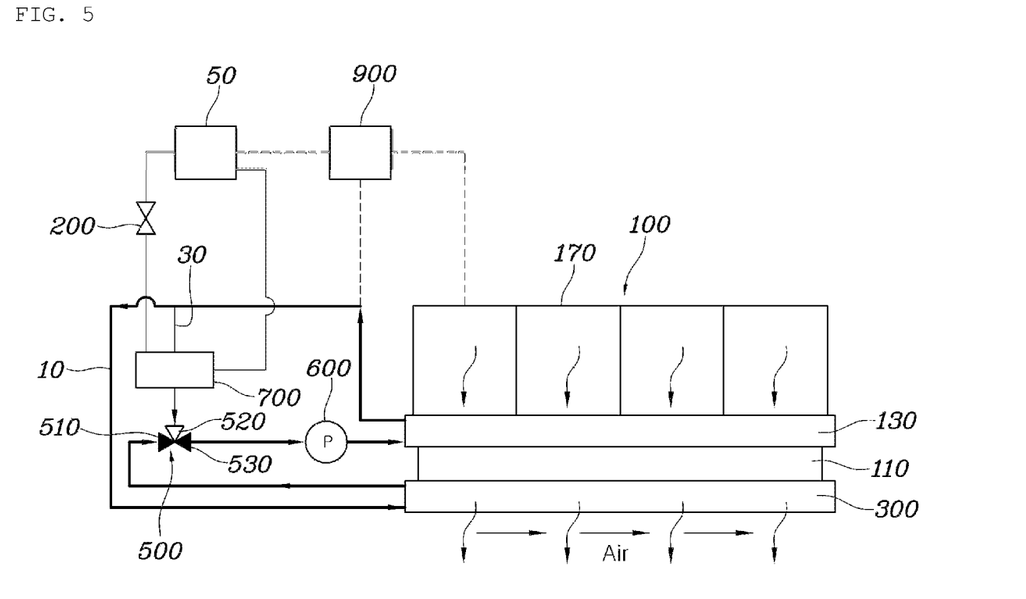
FIG. 5 is a view showing a case of a cooling mode using a radiator.
Figure 6:
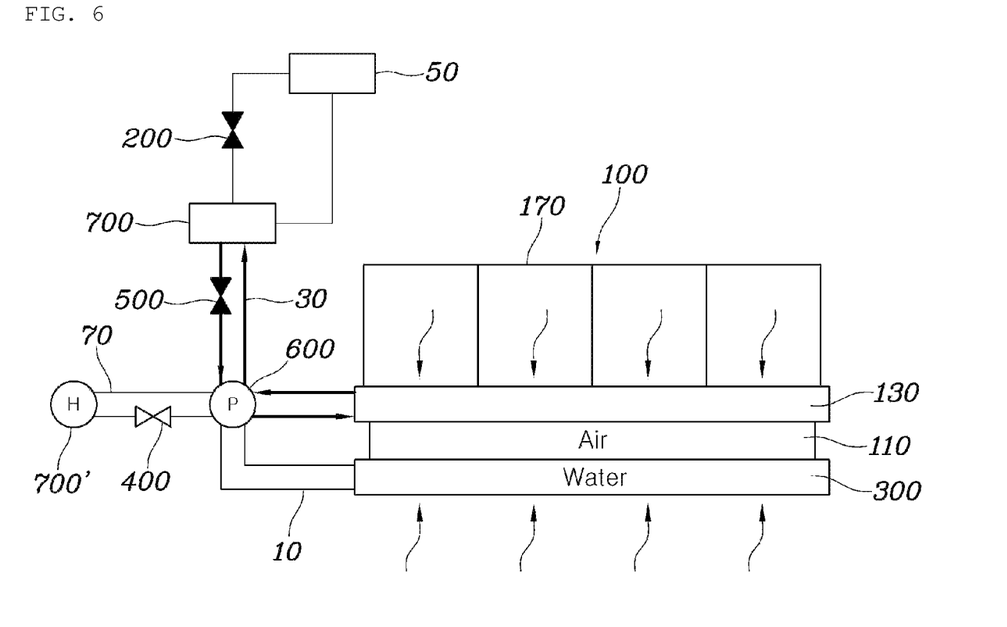
FIG. 6 is a view showing a case of a cooling mode using the heat exchanger in the cooling and heating system for a high-voltage battery of a vehicle according to another embodiment of the present invention.
Figure 7:
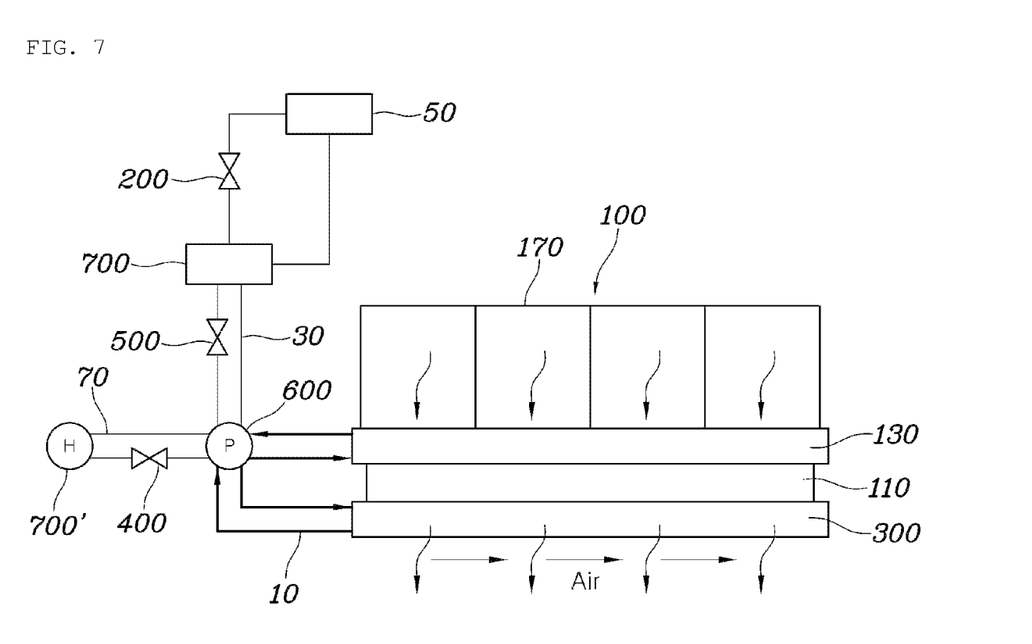
FIG. 7 is a view showing a case of a cooling mode using the radiator of FIG. 6.
Figure 8:
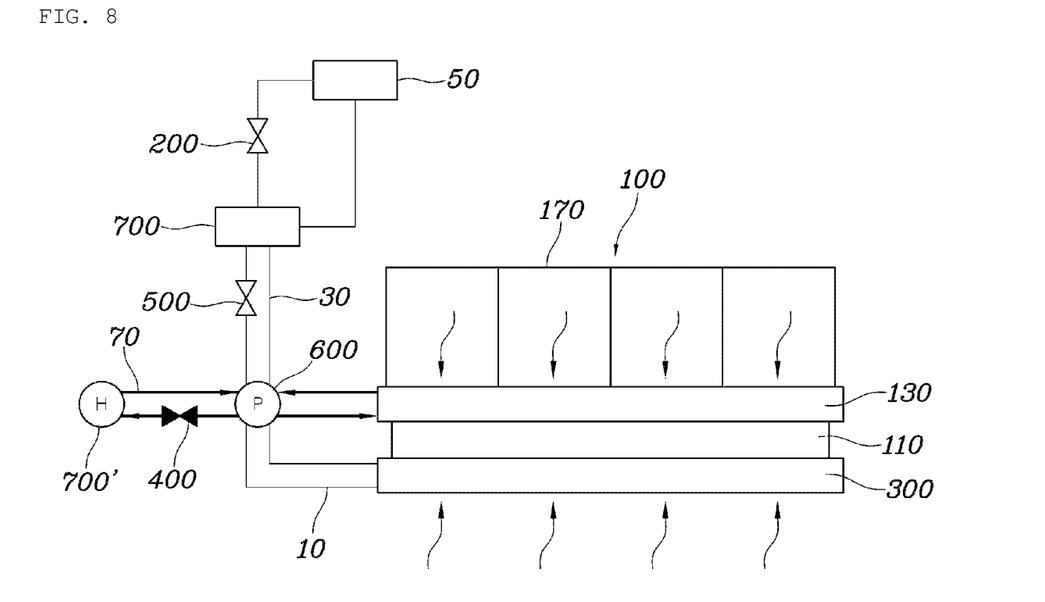
FIG. 8 is a view showing a case of a heating mode using a heater of FIG. 6.

FIG. 1 is a view schematically showing a cooling and heating system for a high-voltage battery of a vehicle according to an embodiment of the present invention; FIG. 2 is a sectional view taken along line A-A of FIG. 1; and FIG. 3 is a view showing a vehicle with the cooling and heating system of FIG. 1 mounted thereto. Further, FIG. 4 is a view showing a case of a cooling mode using a heat exchanger 700; and FIG. 5 is a view showing a case of a cooling mode using a radiator 300. FIG. 6 is a view showing a case of a cooling mode using the heat exchanger 700 in the cooling and heating system for a high-voltage battery of a vehicle according to another embodiment of the present invention; FIG. 7 is a view showing a case of a cooling mode using the radiator 300 of FIG. 6; and FIG. 8 is a view showing a case of a heating mode using a heater 700' of FIG. 6.

As shown in the drawings, the cooling and heating system for a high-voltage battery of a vehicle according to an embodiment of the present invention includes: the radiator 300 provided adjacent to a lower portion of a high-voltage battery module 100 to radiate heat to outside air of a lower portion of the vehicle; an outside air cooling line 10 configured such that cooling water circulates between the radiator 300 and the high-voltage battery module 100, and a main valve 500 is provided on a line through which the cooling water circulates; a bypass line 30 configured such that a first end thereof branches from the main valve 500 and a second end thereof is connected to the outside air cooling line 10 to bypass the radiator 300, and provided with the heat exchanger 700 on the line, and the cooling water exchanges heat with an external cooling medium at the heat exchanger 700; and a controller 900 configured to control the high-voltage battery module 100 to radiate heat to the radiator 300 or to exchange heat with the heat exchanger 700 by controlling the main valve 500 when heat exchange of the high-voltage battery module 100 is required.

Conventionally, since a radiator for cooling the high-voltage battery module of the vehicle is disposed at the front of the vehicle, heat loss occurs while the cooling water cooled by heat exchange in the radiator moves to the high-voltage battery module. However, in the present invention, the radiator 300 for cooling the high-voltage battery module 100 of the vehicle is disposed under the high-voltage battery module 100 rather than at the front of the vehicle so as to be heat exchangeable with outside air of the lower portion of the vehicle, and the cooled cooling water is heat exchangeable directly with the high-voltage battery module 100, whereby it is possible to increase cooling efficiency by reducing heat loss, and running wind is used to dissipate heat, so a cooling fan is not required, whereby it is possible to remove the cooling fan.

As described above, the radiator 300 is disposed under the high-voltage battery module. Accordingly, the radiator 300 is in the form of a plate having a predetermined thickness, and preferably, having a size corresponding to an area of the high-voltage battery module 100 or larger than the area. The high-voltage battery module 100 includes a high-voltage battery 170, and a cooling water channel 130 disposed at a lower portion of the high-voltage battery 170. Accordingly, the cooling water circulates through the cooling water channel 130, whereby the high-voltage battery 170 is cooled or heated. The radiator 300 is provided under the cooling water channel 130, and an insulation part 110 is provided between the high-voltage battery module 100, particularly, the cooling water channel 130 and the radiator 300. The insulation part 110 may be a space having a predetermined height, or a separate insulator may be inserted thereinto. In other words, the radiator 300 is disposed under the cooling water channel 130, and the insulation part 110 is disposed between the cooling water channel 130 and the radiator 300. Accordingly, it is possible to increase heat exchange efficiency by insulating between the cooling water channel 130 and the radiator 300 with the insulation part 110.

Further, the radiator 300 is provided with a heat sink fin 150 protruding in a direction opposite to the high-voltage battery module 100, wherein the heat sink fin 150 is formed to be long in forward and backward directions of the vehicle such that the heat sink fin 150 is cooled by running wind during vehicle travel, whereby it is possible to increase cooling efficiency. A casing 800 is provided outside the high-voltage battery module 100 and the radiator 300 to surround the high-voltage battery module 100 and the radiator 300, wherein the heat sink fin 150 is exposed outside the casing 800 by penetrating through the casing 800, whereby the cooling efficiency of the heat sink fin 150 is increased by running wind during vehicle travel, and it is possible to protect the cooling water channel 130 when a crash occurs.

The outside air cooling line 10 is in the form of a closed loop such that the cooling water circulates between the radiator 300 and the high-voltage battery module 100, and the main valve 500 is provided on a line through which the cooling water circulates. A bypass line 30 is configured such that a first end thereof branches from the main valve 500 and a second end thereof is connected to the outside air cooling line 10 to bypass the radiator 300. In other words, the bypass line 30 is connected to the outside air cooling line 10 via the main valve 500, and the radiator 300 is separated from or connected to the high-voltage battery module 100 by the bypass line 30. Particularly, the outside air cooling line 10 and the bypass line 30 form flow paths independent from each other, wherein the bypass line 30 shares a part of a line including the high-voltage battery module 100 of the outside air cooling line 10 to form the closed loop.

The bypass line 30 is provided with the heat exchanger 700. The heat exchanger 700 may be a cooling heat exchanger 700 for only cooling, may be a heat exchanger 700 performing cooling and heating using a heat pump principle, or may be provided with both the cooling heat exchanger 700 and a heating heat exchanger 700. Particularly, when the heat exchanger 700 is the cooling heat exchanger 700, it may be a chiller configured to cool the cooling water by exchanging heat with the refrigerant of an indoor air conditioning-refrigerant line 50. When the heat exchanger 700 is the heating heat exchanger 700, it may be a heater 700' configured to heat the cooling water by exchanging heat with the refrigerant of the indoor air conditioning-refrigerant line 50, or may be an electric heater 700' controlled by the controller 900.

Particularly, the bypass line 30 is provided to be exchangeable with the indoor air conditioning-refrigerant line 50 at the heat exchanger 700, whereby when the high-voltage battery module 100 is cooled, the cooling water cooled by heat exchange with the refrigerant line 50 cools the high-voltage battery module 100. Accordingly, the refrigerant line 50 is provided with a connecting valve 200 configured to supply or block a refrigerant such that the refrigerant of the refrigerant line 50 is heat exchangeable with the cooling water of the bypass line 30 in the heat exchanger 700, and it is preferred that the opening or closing of the connecting valve 200 be controlled by the controller 900.

The outside air cooling line 10 is provided with a circulating pump 600, wherein the controller 900 drives or stops the circulating pump. Particularly, the circulating pump 600 is disposed between the bypass line 30 and the high-voltage battery module 100, at a side of a line of including the high-voltage battery module 100 of the outside air cooling line 10. Thus, even when the cooling water circulates through the outside air cooling line 10, intervention of the circulating pump 600 is possible, and even when the cooling water circulates through parts of the bypass line 30 and the outside air cooling line 10 while bypassing the radiator 300, intervention of the circulating pump 600 is possible.

The main valve 500 is a multiway valve, and opening of ports thereof is controlled by the controller 900. In the present invention, the main valve 500 is shown as a 3-way valve, but the number of ports may be changed as needed. The main valve 500 is constituted by a first port 510 on the radiator 300 side, a second port 520 on the bypass line 30 side, and a third port 530 on the high-voltage battery module 100 side.

When heat exchange of high-voltage battery module 100 is required, the controller 900 controls the main valve 500 such that the high-voltage battery module 100 radiates heat through the radiator 300 or exchanges heat with the heat exchanger 700, and controls the circulating pump 600 and the connecting valve 200 of the refrigerant line 50 such that the heat exchanger 700 on the bypass line 30 and the refrigerant of the refrigerant line 50 exchange heat with each other.

The circulation of the cooling water according to each mode of a first embodiment of the present invention will be described with reference to FIGS. 4 to 5.

FIG. 4 is a view showing a cooling mode using the heat exchanger 700 of the cooling mode in the high-voltage battery module 100 when the temperature outside the vehicle is high (for example, in summer), and reference will be made to the case where the heat exchanger 700 is a chiller. When cooling of the high-voltage battery module 100 is required, the controller 900 closes the first port 510 of the main valve 500 such that the cooling water circulates while sharing a part of a line including the high-voltage battery module 100 of the outside air cooling line 10 with the bypass line 30, whereby the cooling water exchanges heat with the heat exchanger 700 to perform cooling of the high-voltage battery module 100. Here, the connecting valve 200 of the refrigerant line 50 is opened, whereby the refrigerant line 50 and the heat exchanger 700 exchange heat with each other such that the cooling water is cooled. In other words, the controller 900 controls the main valve 500 such that the bypass line 30 and a part of a line including the high-voltage battery module 100 of the outside air cooling line 10 form a closed loop to allow the cooling water to circulate therethrough, and controls the cooling water cooled by exchanging heat at the heat exchanger 700 to cool the high-voltage battery module 100.

On the contrary, FIG. 4 is a view showing a case where the heat exchanger 700 is a heater or an electric heater.

Accordingly, when heating of the high-voltage battery module 100 is required, the controller 900 closes the first port 510 of the main valve 500 the cooling water circulates while sharing a part of a line including the high-voltage battery module 100 of the outside air cooling line 10 with the bypass line 30, whereby the cooling water exchanges heat with the heat exchanger 700 to perform heating of the high-voltage battery module 100. Here, the connecting valve 200 of the refrigerant line 50 is opened, whereby the refrigerant line 50 and the heat exchanger 700 exchange heat with each other such that the cooling water is heated. In other words, the controller 900 controls the main valve 500 such that the bypass line 30 and a part of a line including the high-voltage battery module 100 of the outside air cooling line 10 form a closed loop to allow the cooling water to circulate therethrough, and controls the cooling water heated by exchanging heat at the heat exchanger 700 to heat the high-voltage battery module 100.

FIG. 5 is a view showing a cooling mode using the heat exchanger 700 of the cooling mode in the high-voltage battery module 100 when the temperature outside the vehicle is not very high (for example, in spring or fall). Accordingly, when cooling of the high-voltage battery module 100 is required, the controller 900 closes the second port 520 of the main valve 500 such that the cooling water circulates through the outside air cooling line 10 to exchange heat with the radiator 300, thereby performing cooling of the high-voltage battery module 100. In other words, the controller 900 controls the main valve 500 such that the cooling water circulates through the outside air cooling line 10, and controls the cooling water cooled by exchanging heat through the radiator 300 to cool the high-voltage battery module 100.

Further, FIGS. 6 to 7 show the cooling and heating system for the high-voltage battery 170 according to a second embodiment of the present invention. The second embodiment is constituted by the same configuration and circuitry as the first embodiment, wherein the bypass line 30 is provided with the cooling heat exchanger 700, and either of the bypass line 30 or the outside air cooling line 10 is provided with the heater 700' in parallel with the cooling heat exchanger 700. Alternatively, the heat exchanger 700 includes a heat exchanger 700 for cooling and a heat exchanger 700 for heating, and one heat exchanger 700 is disposed on the bypass line 30 and the other heat exchanger 700 is connected in parallel between the bypass line 30 and the outside air cooling line 10 including the high-voltage battery module 100 to constitute a branch line 70, wherein the branch line 70 is provided with an auxiliary valve 400 configured to connect the branch line 70 and the outside air cooling line 10 together or disconnect the same from each other. Detailed description thereof will be made with reference to the accompanying drawings.

FIG. 6 is a view showing a case of a cooling mode using the heat exchanger 700 in the cooling and heating system for a high-voltage battery 170 of a vehicle according to another embodiment of the present invention when the temperature outside the vehicle is high (for example, in summer). Here, it is preferred that the heat exchanger 700 be a chiller. When cooling of the high-voltage battery module 100 is required, the controller 900 controls the main valve 500 such that the cooling water circulates while sharing a part of a line including the high-voltage battery module 100 of the outside air cooling line 10 with the bypass line 30, whereby the cooling water exchanges heat with the heat exchanger 700 to perform cooling of the high-voltage battery module 100. Here, the connecting valve 200 of the refrigerant line 50 is opened, whereby the refrigerant line 50 and the heat exchanger 700 exchange heat with each other such that the cooling water is cooled. In other words, the controller 900 controls the main valve 500 such that the bypass line 30 and a part of a line including the high-voltage battery module 100 of the outside air cooling line 10 form a closed loop to allow the cooling water to circulate therethrough, and controls the cooling water cooled by exchanging heat at the heat exchanger 700 to cool the high-voltage battery module 100.

FIG. 7 is a view showing a case of a cooling mode using the radiator 300 of FIG. 6 when the temperature outside the vehicle is not very high (for example, in spring or fall). Accordingly, when cooling of the high-voltage battery module 100 is required, the controller 900 controls the main valve 500 such that the cooling water circulates through the outside air cooling line 10 to exchange heat with the radiator 300, thereby performing cooling of the high-voltage battery module 100. In other words, the controller 900 controls the main valve 500 such that the cooling water circulates through the outside air cooling line 10, and controls the cooling water cooled by exchanging heat through the radiator 300 to cool the high-voltage battery module 100.

FIG. 8 is a view showing a case of a heating mode using the heater 700' of FIG. 6, which is the case where the high-voltage battery module 100 is heated using the heater 700' or the electric heater 700'. Accordingly, when heating of the high-voltage battery module 100 is required, the controller 900 controls the main valve 500 such that the cooling water is prevented from moving to the heat exchanger 700, and opens the auxiliary valve 400 provided on the heater 700' side to open the branch line 70 connected in parallel therewith, and the cooling water circulates through the branch line 70 and a part of the outside air cooling line 10, whereby the cooling water exchanges heat with the heater 700' to perform heating of the high-voltage battery module 100. Herein, the heater 700' is an electric heater, and may be controlled to be turned on and off by the controller 900, or may be connected to the refrigerant line 50 to heat the cooling water by the refrigerant, which is not shown in the drawing. In other words, the controller 900 controls both the main valve 500 and the auxiliary valve 400 such that the auxiliary line and a part of a line including the high-voltage battery module 100 of the outside air cooling line 10 form a closed loop to allow the cooling water to circulate therethrough, and controls the cooling water heated by exchanging heat at the heat exchanger 700 to heat the high-voltage battery module 100.

According to the cooling and heating system for a high-voltage battery of a vehicle of the present invention configured as described above, since the cooling water channel, the insulation part, and the radiator are disposed under the high-voltage battery module, it is possible to selectively control the heat transfer according to the ambient temperature, thereby solving the problem of the heat pick-up phenomenon of a vehicle provided with a conventional high-voltage battery module. Further, by applying the radiator of the high-voltage battery module separated from a conventional cooling module, it is possible to prevent heat loss and improve heat exchange performance, and by minimize piping to achieve a compact layout, it is possible to reduce weight and save cost.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A cooling and heating system for a high-voltage battery of a vehicle, the cooling and heating system comprising:
    a radiator provided adjacent to a lower portion of a high-voltage battery module to radiate heat to outside air of a lower portion of the vehicle;
    an outside air cooling line configured such that cooling water circulates between the radiator and the high-voltage battery module, with a main valve being provided on the outside air cooling line through which the cooling water circulates;
    a bypass line configured such that a first end thereof branches from the main valve and a second end thereof is connected to the outside air cooling line to bypass the radiator, with a heat exchanger being provided on the bypass line, whereby the cooling water exchanges heat with an external cooling medium at the heat exchanger; and
    a controller configured to control the high-voltage battery module to radiate heat through the radiator or to exchange heat with the heat exchanger by controlling the main valve when heat exchange of the high-voltage battery module is required,
    wherein the high-voltage battery module includes a cooling water channel disposed at a lower portion of the high-voltage battery, and the cooling water circulates through the cooling water channel, whereby the high-voltage battery is cooled or heated, and
    wherein the radiator is disposed at a lower portion of the cooling water channel, and an insulation part is disposed between the cooling water channel and the radiator,
    wherein the heat exchanger disposed on the bypass line is configured to provide cooling to the high-voltage battery module,
    wherein a second heat exchanger disposed on a branch line connected in parallel between the bypass line and the outside air cooling line, the second heat exchanger being a heater configured to heat the cooling water such that the high-voltage battery module is heated,
    wherein the branch line is provided with an auxiliary valve configured to connect the branch line and the outside air cooling line together or disconnect the same from each other, and
        wherein in a heating mode, the controller controls the main valve such that the bypass line and a part of a line including the high-voltage battery module of the outside air cooling line form a closed loop to allow the cooling water to circulate therethrough, and controls the cooling water heated by exchanging heat through the heat exchanger to heat the high-voltage battery module by closing a connecting valve and opening the auxiliary valve.

2. The cooling and heating system of claim 1, wherein the bypass line shares a part of a line including the high-voltage battery module of the outside air cooling line to form a closed loop.

3. The cooling and heating system of claim 1, wherein the main valve is a multiway valve constituted by a first port at a side of the radiator, a second port at a side of the bypass line, and a third port at a side of the high-voltage battery module, and
    the controller closes the second port of the main valve when cooling of the high-voltage battery module is required such that the cooling water circulates through the outside air cooling line to exchange heat with the radiator, thereby performing cooling of the high-voltage battery module.

4. The cooling and heating system of claim 1, wherein the main valve is a multiway valve constituted by a first port at a side of the radiator, a second port at a side of the bypass line, and a third port at a side of the high-voltage battery module, and
    the controller closes the first port of the main valve when cooling of the high-voltage battery module is required such that the cooling water circulates while sharing a part of a line including the high-voltage battery module of the outside air cooling line with the bypass line, whereby the cooling water exchanges heat with the heat exchanger to perform cooling of the high-voltage battery module.

5. The cooling and heating system of claim 1, wherein the main valve is a multiway valve constituted by a first port at a side of the radiator, a second port at a side of the bypass line, and a third port at a side of the high-voltage battery module, and the controller closes the first port of the main valve when heating of the high-voltage battery module is required such that the cooling water circulates while sharing a part of a line including the high-voltage battery module of the outside air cooling line with the bypass line, whereby the cooling water exchanges heat with the heat exchanger to perform heating of the high-voltage battery module.

6. The cooling and heating system of claim 1, wherein the outside air cooling line is provided with a circulating pump, and the controller drives or stops the circulating pump.

7. The cooling and heating system of claim 6, wherein the circulating pump is disposed between the bypass line and the high-voltage battery module, at a side of a line including the high-voltage battery module of the outside air cooling line.

8. The cooling and heating system of claim 1, wherein the bypass line is heat exchangeable with an indoor air conditioning-refrigerant line through the heat exchanger, so as to exchange heat with the refrigerant line when cooling the high-voltage battery module, whereby the cooled cooling water cools the high-voltage battery module.

9. Wherein the refrigerant line is provided with the connecting valve configured to supply or block a refrigerant such that the refrigerant of the refrigerant line exchanges heat with the cooling water of the bypass line in the heat exchanger.

10. The cooling and heating system of claim 1,
wherein the heat exchanger disposed on the bypass line is configured to provide cooling to the high-voltage battery module,
wherein a second heat exchanger disposed on a branch line connected in parallel between the bypass line and the outside air cooling line is configured to provide heating to the high-voltage battery module, and
wherein the branch line is provided with an auxiliary valve configured to connect the branch line and the outside air cooling line together or disconnect the same from each other.

11. The cooling and heating system of claim 1, wherein the radiator has a size corresponding to an area of the high-voltage battery module or larger than the area.

12. The cooling and heating system of claim 1, wherein an insulation part defining a predetermined space is provided between the high-voltage battery module and the radiator.

13. The cooling and heating system of claim 1, wherein the radiator is provided with a heat sink fin protruding in a direction opposite to the high-voltage battery module.

14. The cooling and heating system of claim 13, wherein a casing is provided outside the high-voltage battery module and the radiator to surround the high-voltage battery module and the radiator, and the heat sink fin is exposed outside the casing by penetrating through the casing.

15. The cooling and heating system of claim 13, wherein the heat sink fin is formed to be long in forward and backward directions of the vehicle such that the heat sink fin is cooled by running wind during vehicle travel.

16. The cooling and heating system of claim 1, wherein in a cooling mode, the controller controls the main valve such that the cooling water circulates through the outside air cooling line, and controls the cooling water cooled by exchanging heat through the radiator to cool the high-voltage battery module.

17. The cooling and heating system of claim 1, wherein in a cooling mode, the controller controls the main valve such that the bypass line and a part of a line including the high-voltage battery module of the outside air cooling line form a closed loop to allow the cooling water to circulate therethrough, and controls the cooling water cooled by exchanging heat through the heat exchanger to cool the high-voltage battery module.

* * * * *